(12) United States Patent
Greenberg et al.

(10) Patent No.: US 8,061,904 B1
(45) Date of Patent: Nov. 22, 2011

(54) FIBER OPTIC CONNECTOR MICROLENS WITH SELF-ALIGNING OPTICAL FIBER CAVITY

(75) Inventors: Reid Greenberg, Mountain View, CA (US); Igor Zhovnirovsky, Newton, MA (US); Subhash Roy, Lexington, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 12/862,614

(22) Filed: Aug. 24, 2010

Related U.S. Application Data

(63) Continuation-in-part of application No. 12/793,513, filed on Jun. 3, 2010, which is a continuation-in-part of application No. 12/784,849, filed on May 21, 2010, which is a continuation-in-part of application No. 12/756,087, filed on Apr. 7, 2010, which is a continuation-in-part of application No. 12/652,705, filed on Jan. 5, 2010, which is a continuation-in-part of application No. 12/581,799, filed on Oct. 19, 2009, which is a continuation-in-part of application No. 12/483,616, filed on Jun. 12, 2009.

(51) Int. Cl.
*G02B 6/38* (2006.01)
*G02B 6/42* (2006.01)
*G02B 6/32* (2006.01)
*G02B 6/36* (2006.01)
*G02B 6/00* (2006.01)

(52) U.S. Cl. ............... 385/74; 385/31; 385/33; 385/52; 385/53; 385/73; 385/76; 385/88; 385/92; 385/93; 385/139

(58) Field of Classification Search .................. 385/31, 385/33, 52, 53, 73, 74, 76, 88, 92, 93, 139
See application file for complete search history.

(56) References Cited

U.S. PATENT DOCUMENTS

2001/0048793 A1* 12/2001 Dair et al. .................. 385/92
2008/0107381 A1* 5/2008 Nishioka et al. ............ 385/60
* cited by examiner

*Primary Examiner* — Brian M. Healy
*Assistant Examiner* — Hung Lam
(74) *Attorney, Agent, or Firm* — Law Office of Gerald Maliszewski; Gerald Maliszewski

(57) ABSTRACT

A fiber optical connector microlens is provided with a self-aligning optical fiber cavity. The microlens includes a convex first lens surface and a second lens surface. A fiber alignment cavity is integrally formed with the second lens surface to accept an optical fiber core. A lens body is interposed between the first and second lens surfaces, having a cross-sectional area with a lens center axis, and the fiber alignment cavity is aligned with the lens center axis. In a first aspect, the fiber alignment cavity penetrates the lens second surface. In a second aspect, an integrally formed cradle with a cradle surface extends from the lens second surface, and a channel is formed in the cradle surface, with a center axis aligned with the lens center axis. The fiber alignment cavity includes a bridge covering a portion of the channel.

25 Claims, 17 Drawing Sheets

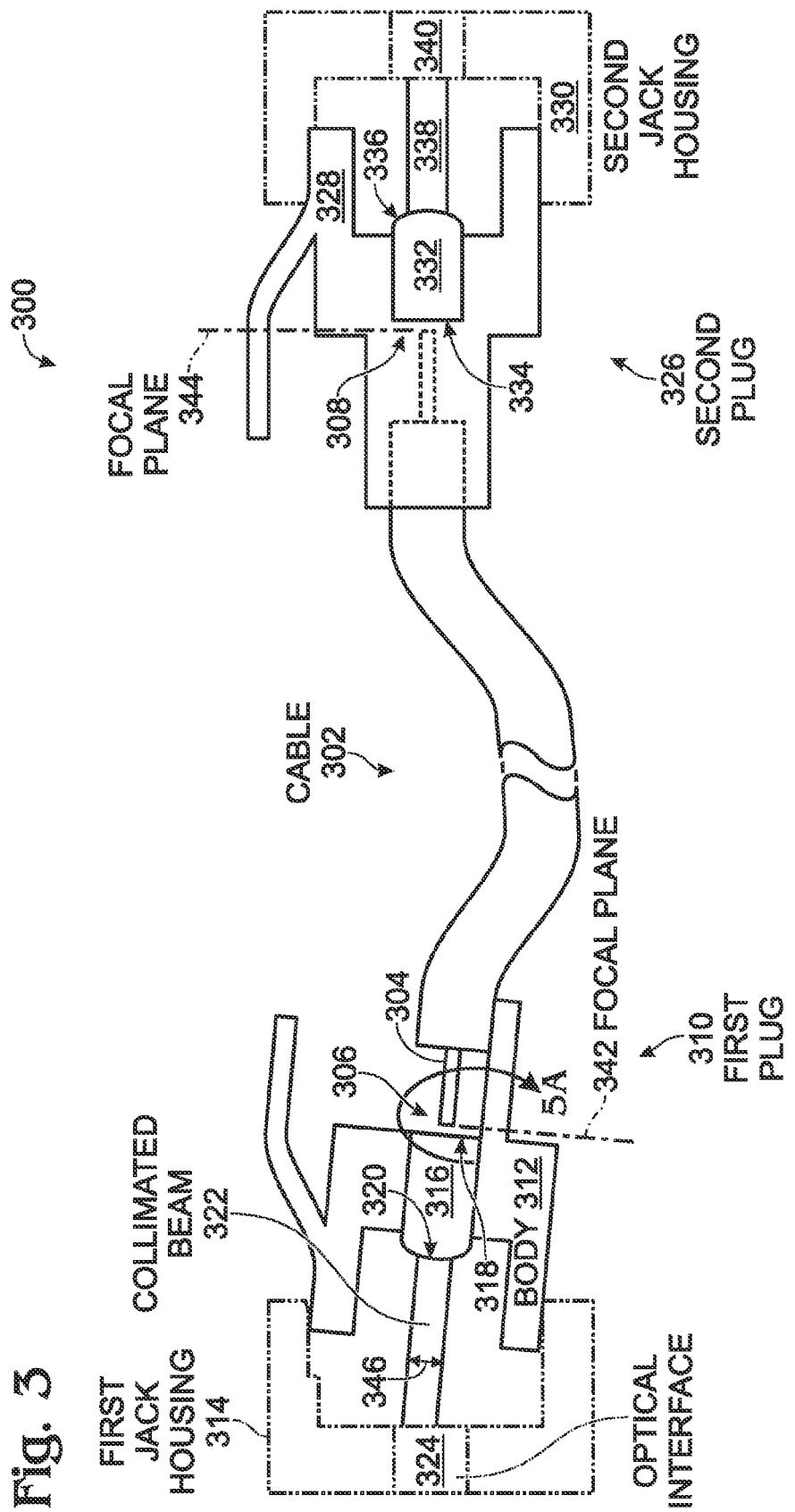

Fig. 13  IMPORTANT TOLERANCES AND THEIR EFFECT ON Tx/Rx COUPLING EFFICIENCY

| | DESCRIPTION OF TOLERANCE | TX: EFFECTIVE FIBER DECENTER | RX: EFFECTIVE PD DECENTER |
|---|---|---|---|
| T1 | VCSEL/PD PLACEMENT ON CIRCUIT BOARD | ± 9.6 μm | ± 7.1 μm |
| T2 | CIRCUIT BOARD MISALIGNMENT | ± 9.6 μm | ± 7.1 μm |
| T3 | PLUG INSERTION ANGULAR ERROR | ± 30.3 μm | ± 21.9 μm |
| T4 | PLUG LENS PLACEMENT (IF RELATIVE TO GROOVES) | ± 14.1 μm | ± 10.3 μm |
| T5 | GROOVE PLACEMENT (IF RELATIVE TO LENS) | ± 7.1 μm | ± 5.2 μm |

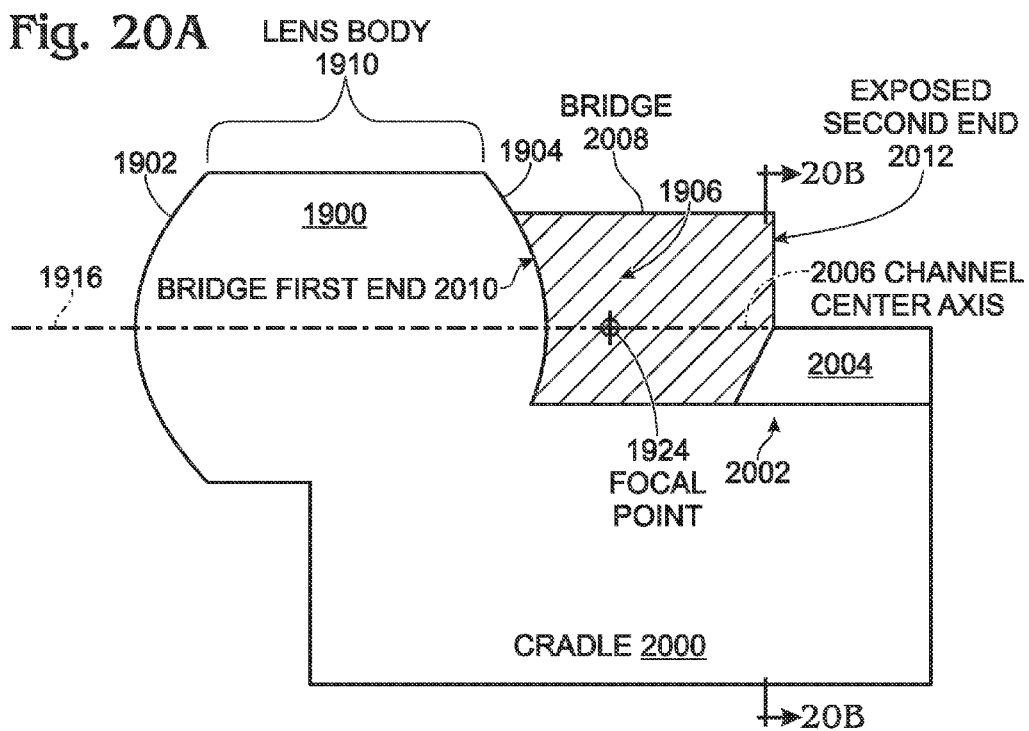
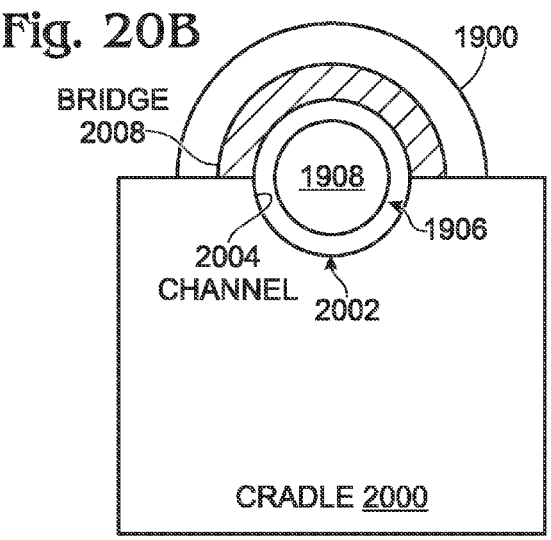

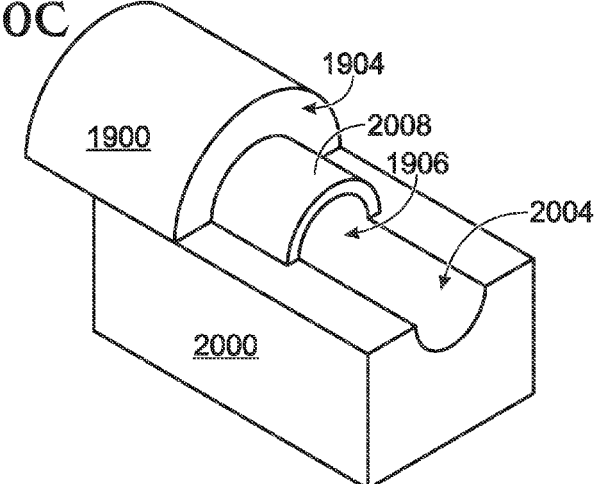
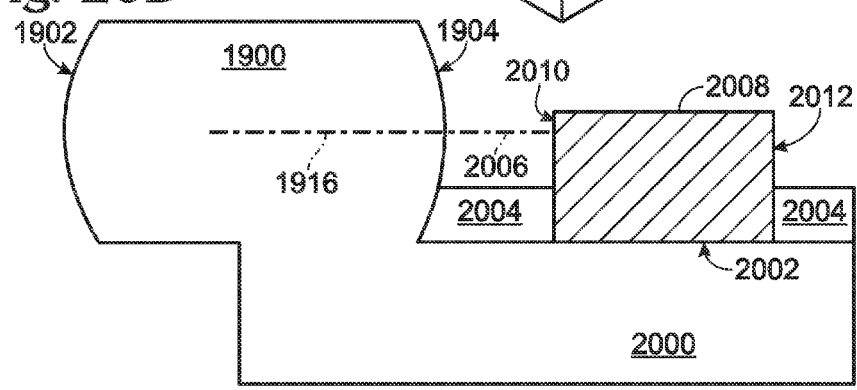
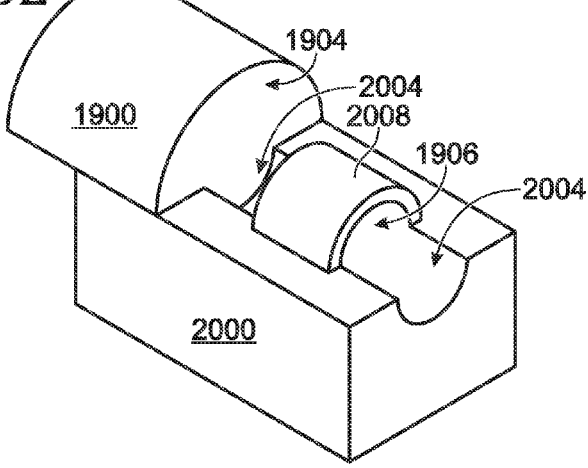

FIBER OPTIC CONNECTOR MICROLENS WITH SELF-ALIGNING OPTICAL FIBER CAVITY

RELATED APPLICATIONS

This application is a Continuation-in-Part of a pending application entitled, FIBER OPTIC JACK WITH HIGH INTERFACE MISMATCH TOLERANCE, invented by Igor Zhovnirovsky et al., Ser. No. 12/793,513, filed Jun. 3, 2010;

which is a Continuation-in-Part of a pending application entitled, FIBER OPTIC CABLE WITH HIGH INTERFACE MISMATCH TOLERANCE, invented by Igor Zhovnirovsky et al., Ser. No. 12/784,849, filed May 21, 2010;

which is a Continuation-in-Part of a pending application entitled, PUNCH-DOWN FIBER OPTIC CABLE TERMINATION, invented by Igor Zhovnirovsky et al., Ser. No. 12/756,087, filed Apr. 7, 2010;

which is a Continuation-in-Part of a pending application entitled, CONNECTOR JACK PROCESSING BACKCAP, invented by Igor Zhovnirovsky et al., Ser. No. 12/652,705, filed Jan. 5, 2010;

which is a Continuation-in-Part of a pending application entitled, OFF-AXIS MISALIGNMENT COMPENSATING FIBER OPTIC CABLE INTERFACE, invented by Igor Zhovnirovsky et al., Ser. No. 12/581,799, filed Oct. 19, 2009;

which is a Continuation-in-Part of a pending application entitled, FIBER OPTIC CABLE INTERFACE, invented by Igor Zhovnirovsky et al., Ser. No. 12/483,616, filed Jun. 12, 2009. All the above-referenced applications are incorporated herein by reference.

BACKGROUND OF THE INVENTION

1. Field of the Invention

This invention generally relates to optical cables and, more particularly, to a fiber optical plug connector with a mechanism for aligning the core of an optical fiber with a plug microlens.

2. Description of the Related Art

Conventionally, optical fiber connectors are spring-loaded. The fiber endfaces (optical interfaces) of the two connectors are pressed together, resulting in a direct glass to glass or plastic to plastic, contact. The avoidance of glass-to-air or plastic-to-air interfaces is critical, as an air interface results in higher connector losses. However, the tight tolerances needed to eliminate an air interface make these connectors relatively expensive to manufacture.

FIG. 1 is a partial cross-sectional view of a Transmission Optical SubAssembly (TOSA) optical cable plug (prior art). The plug 100 is made from a plastic housing 102 with a bored ferrule 106 to secure an optical fiber 108. The plug 100 also includes a plastic lens 110, manufactured as a subassembly, integrated into the plug. The lens 110 has a curved surface to create a focal plane where the plug mates with a jack 112. The lens permits a low loss air gap to be formed between the plug and a connecting jack. In addition to the expense of manufacturing a 2-part plug, the plug must be made to relatively tight tolerances, so that the lens focal plane aligns with the jack, which also increases the cost of the plug.

FIG. 2 is a partial cross-sectional view of an 8 Position 8 Contact (8P8C) interface (prior art). The ubiquitous 8P8C connector is a hardwired electrical connector used commercially and residentially to connect personal computers, printers, and routers. The 8P8C is often referred to as RJ45. Although the housing/body can be made as a one-piece plastic molding, the spring-loaded contacts and the necessity of cable crimping add to the complexity of manufacturing the part. Advantageously however, the spring-loaded contacts permit the part to be made to relatively lax tolerances.

As noted in Wikipedia, plastic optical fiber (POF) is an optical fiber which is made out of plastic. Conventionally, poly(methyl methacrylate) (PMMA), a transparent thermoplastic (acrylic) alternative to glass, is the core material, and fluorinated polymers are the cladding material. Since the late 1990s however, much higher-performance POF based on perfluorinated polymers (mainly polyperfluorobutenylvinylether) has begun to appear in the marketplace.

In large-diameter fibers, 96% of the cross section is the core that allows the transmission of light. Similar to conventional glass fiber, POF transmits light (or data) through the core of the fiber. The core size of POF is in some cases 100 times larger than glass fiber.

POF has been called the "consumer" optical fiber because the fiber and associated optical links, connectors, and installation are all inexpensive. The conventional PMMA fibers are commonly used for low-speed, short-distance (up to 100 meters) applications in digital home appliances, home networks, industrial networks (PROFIBUS, PROFINET), and car networks (MOST). The perfluorinated polymer fibers are commonly used for much higher-speed applications such as data center wiring and building LAN wiring.

For telecommunications, the more difficult to use glass optical fiber is more common. This fiber has a core made of germania-doped silica. Although the actual cost of glass fibers is lower than plastic fiber, their installed cost is much higher due to the special handling and installation techniques required. One of the most exciting developments in polymer fibers has been the development of microstructured polymer optical fibers (mPOF), a type of photonic crystal fiber.

In summary, POF uses PMMA or polystyrene as a fiber core, with refractive indices of 1.49 & 1.59, respectively. The fiber cladding overlying the core is made of silicone resin (refractive index ~1.46). A high refractive index difference is maintained between core and cladding. POF have a high numerical aperture, high mechanical flexibility, and low cost.

Generally, POF is terminated in cable assembly connectors using a method that trims the cables, epoxies the cable into place, and cures the epoxy. ST style connectors, for example, include a strain relief boot, crimp sleeve, and connector (with ferrule). The main body of the connector is epoxied to the fiber, and fiber is threaded through the crimp sleeve to provide mechanical support. The strain relief boot prevents to fiber from being bent in too small of a radius. Some connectors rely upon the connector shape for mechanical support, so a crimp sleeve is not necessary.

First, the strain relief boot and crimp sleeve are slid onto the cable. A jacket stripping tool must be used to remove the end portion of the fiber, exposing an aramid yarn (e.g., Kevlar™) covered buffer or cladding layer. Next, a buffer stripping tool is used to remove a section of the buffer layer, exposing the core. After mixing, a syringe is filled with epoxy. A bead of epoxy is formed at the end of the ferrule, and the ferrule back-filled with epoxy. The exposed fiber core is threaded through the connector ferrule with a rotating motion, to spread the epoxy, until the jacket meets the connector. At this point the crimping sleeve is slide onto the connector body and crimped in two places. Then, the strain relief boot can be slide over the crimp sleeve. After the epoxy cures, the core extending through the ferrule is polished with a lapping film. Then, the core is scribed at the point where it extends from the epoxy bead. The extending core portion is then cleaved from the connector and polished in multiple steps.

As noted in the above-referenced parent applications, the advantages of using a microlens in a plug or jack connector include the ability to focus light on point, such as a photodiode or optical fiber core face, while transceiving light in a collimated beam between connectors. However, the focusing of light on a fiber core face requires that the fiber core and microlens be properly aligned.

It would be advantageous if an optical connector plug had a mechanism for self-aligning an optical fiber core with a plug microlens.

SUMMARY OF THE INVENTION

According, a fiber optical connector microlens is provided with a self-aligning optical fiber cavity. The microlens includes a convex first lens surface and a second lens surface. A fiber alignment cavity is integrally formed with the second lens surface to accept an optical fiber core. A lens body is interposed between the first and second lens surfaces, having a cross-sectional area with a lens center axis, and the fiber alignment cavity is aligned with the lens center axis. In a first aspect, the fiber alignment cavity is formed in (penetrates) the lens second surface.

In a second aspect, an integrally formed cradle with a cradle surface extends from the lens second surface, and a channel is formed in the cradle surface, with a center axis aligned with the lens center axis. The fiber alignment cavity includes a bridge covering a portion of the channel. In a related aspect, a crimping plate with an interior surface is mechanically secured to the cradle, and a crimping channel formed in the crimping plate interior surface, with a center axis aligned with the lens center axis. The fiber alignment cavity is formed between the cradle channel and crimping channel.

In yet another aspect, the fiber alignment cavity is an integrally formed tube extending from the lens second surface, with a center axis aligned with the lens center axis. The tube has a proximal end adjacent the lens second surface with a first diameter to accept an optical fiber core, and a distal end with a second diameter to accept an optical fiber with a cladding layer.

Additional details of the above-described microlens with self-aligning optical fiber cavity, and a fiber optic connector plug with an optical fiber self-alignment mechanism, are provided below.

BRIEF DESCRIPTION OF THE DRAWINGS

FIG. 3 is a diagram depicting a fiber optic cable.

FIG. 13 is a table of tolerances cross-referenced to fiber lateral decentering.

FIGS. 20A, 20B, and 20D are partial cross-sectional views depicting a second variation of the fiber optical connector microlens with self-aligning optical fiber cavity, and FIGS. 20C and 20E are perspective drawings.

DETAILED DESCRIPTION

Figure 1:
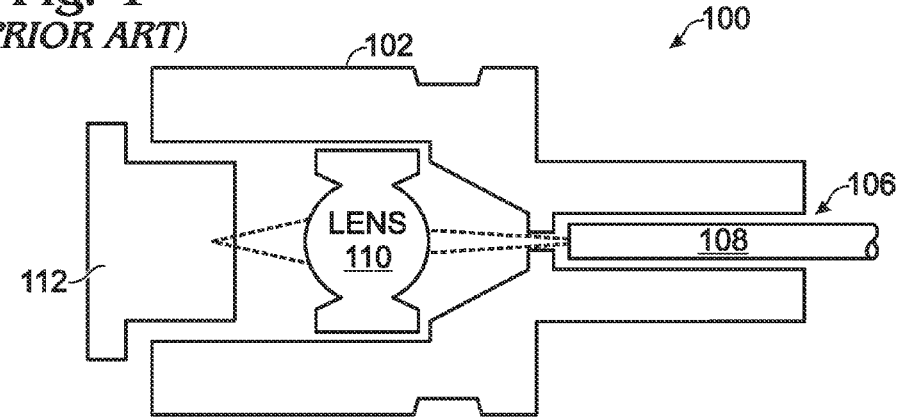
FIG. 1 is a partial cross-sectional view of a Transmission Optical SubAssembly (TOSA) optical cable plug (prior art).
Figure 2:
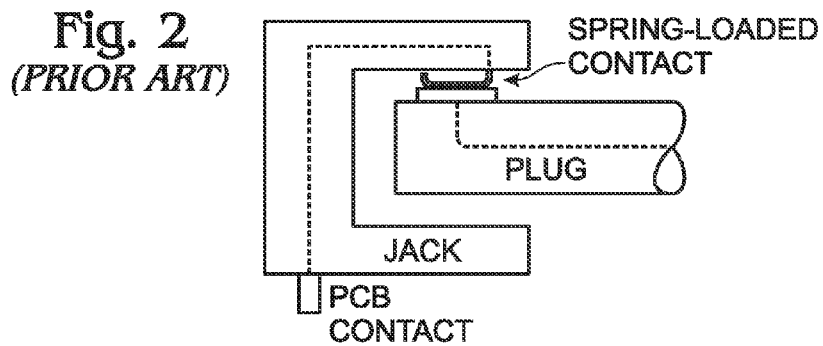
FIG. 2 is a partial cross-sectional view of an 8 Position 8 Contact (8P8C) interface (prior art).

FIG. 3 is a diagram depicting a fiber optic cable. The fiber optic cable 300 comprises a cable section 302 including at least one length of fiber optic line or core 304 having a first end 306 and a second end 308. A first plug 310 includes a mechanical body 312 shaped to selectively engage and disengage a first jack housing 314 (shown in phantom), and a microlens 316. As defined herein, the plug is mechanically engaged with the jack when the plug is fully inserted into the jack. In some aspects, a locking mechanism is enabled when the plug and jack are mechanically engaged. An RJ-45 connector is one example of such a locking type mechanical engagement (as shown). In other aspects, mechanical engagement is obtained with a pressure or friction type fit. A universal serial bus (USB) connector, microUSB, HDMI, and DisplayPort are some examples of a pressure/friction type of mechanical engagement. Alternately stated, a plug and jack are mechanically engaged when they are mated sufficiently to perform their intended electrical or optical functions.

The first plug microlens 316 has a planar surface 318 to engage the fiber optic line first end 306 and a convex surface 320 to transceive light in a first collimated beam 322 with a first jack optical interface 324. Likewise, a second plug 326 includes a mechanical body 328 shaped to selectively engage and disengage a second jack housing 330 (shown in phantom), and a microlens 332. The second plug microlens 332 has a planar surface 334 to engage the fiber optic line second end 308 and a convex surface 336 to transceive light in a second collimated beam 338 with a second jack optical interface 340.

A collimated beam is light whose rays are parallel, and therefore the beam spreads slowly as it propagates. Laser light from gas or crystal lasers is naturally collimated because it is formed in an optical cavity between two mirrors, in addition to being coherent. However, diode lasers do not naturally emit collimated light, and therefore collimation into a beam requires a collimating lens. A perfect parabolic mirror will bring parallel rays to a focus at a single point. Conversely, a point source at the focus of a parabolic mirror will produce a beam of collimated light. Spherical mirrors are easier to make than parabolic mirrors and they are often used to produce approximately collimated light. Many types of lenses can also produce collimated light from point-like sources.

The fiber optic cable first end 306 is formed in a focal plane 342 of the first plug microlens 316, and the fiber optic cable second end 308 is formed in a focal plane 344 of the second plug microlens 332. In one aspect, the first and second plug microlenses 316/332 are made from a polycarbonate resin thermoplastic such as lexan or ultem, and have respective focal lengths 342 and 344 in the range of 2 to 4 mm. The first and second plug microlens 316 and 332 transceive the collimated beams with a beam diameter 346 in the range of 1.2 to 1.3 mm.

As used herein, a jack is the "female" connector and a plug is a mating "male" connector. Note, a portion of the first plug body has been cut away to show the fiber line 304. In some aspects, a crimping plate is connected to a cradle portion of the body, to hold the fiber line in place. See parent application Ser. No. 12/581,799 for additional details.

Figure 4A:
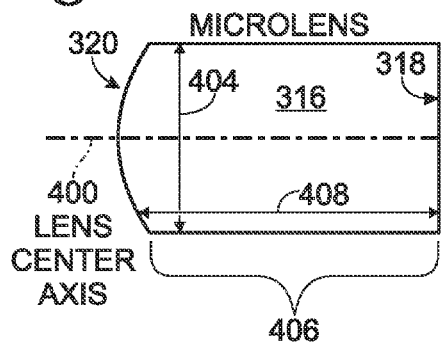
FIGS. 4A and 4B are a more detailed depiction of the first plug microlens of FIG. 3.
Figure 4B:
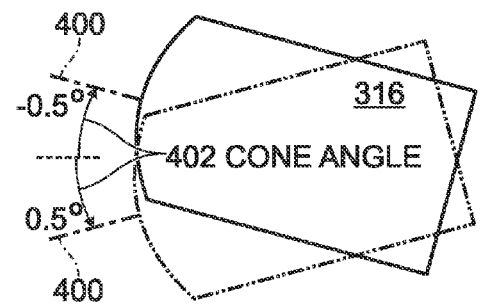

FIGS. 4A and 4B are a more detailed depiction of the first plug microlens of FIG. 3. For clarity, only the microlens 316 is shown. The first plug microlens 316 has a lens center axis 400. As shown in FIG. 4B, there is a lens axis tolerance defined by a cone angle 402 of up to 0.5 degrees (+/−0.5 degrees from a perfectly aligned, or tolerance midpoint lens center axis) as a result of the first plug mechanical body tolerances, when engaging the first jack mechanical body. That is, due to "play" between the jack and plug housings, resulting from design and manufacturing tolerances, the lens axis may be misaligned as much as 0.5 degrees. Note: although misalignment is only shown in an XY plane, the lens axis tolerance may define a circular cone with respect to a perfectly aligned center axis.

The first plug microlens has a diameter 404 in the range of 2 to 3 mm, and the first collimated beam diameter (see FIG. 3, reference designator 346) is transceived within the microlens diameter 404. The first plug microlens 316 includes a cylindrical section 406 interposed between the planar surface 318 and the convex surface 320.

In one aspect, the first plug microlens cylindrical section 406 has a length 408 in the range of 4 to 6 mm and the convex surface 320 has a radius of curvature in the range of 1.5 to 2.5 mm. The second plug microlens, not shown, has the same lens dimensions and tolerances as the first plug microlens.

Figure 5A:
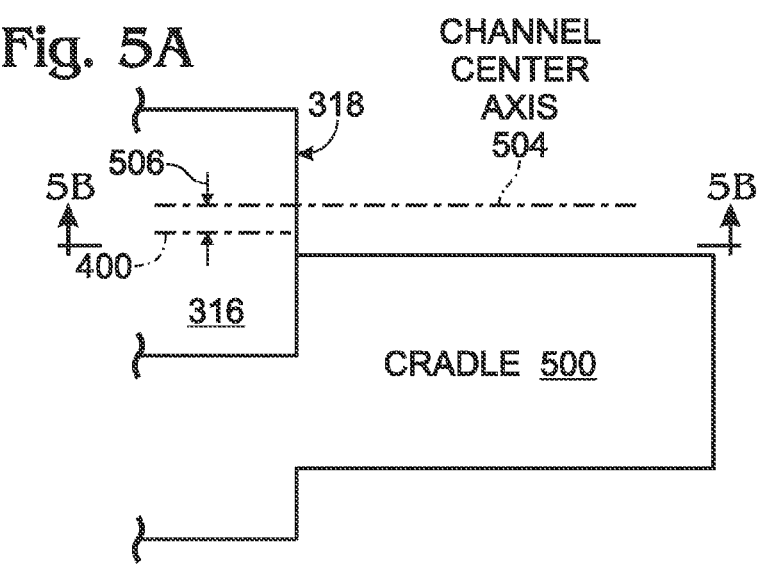
FIGS. 5A and 5B are partial cross-sectional and plan views, respectively, of the first plug of FIG. 3.
Figure 5B:
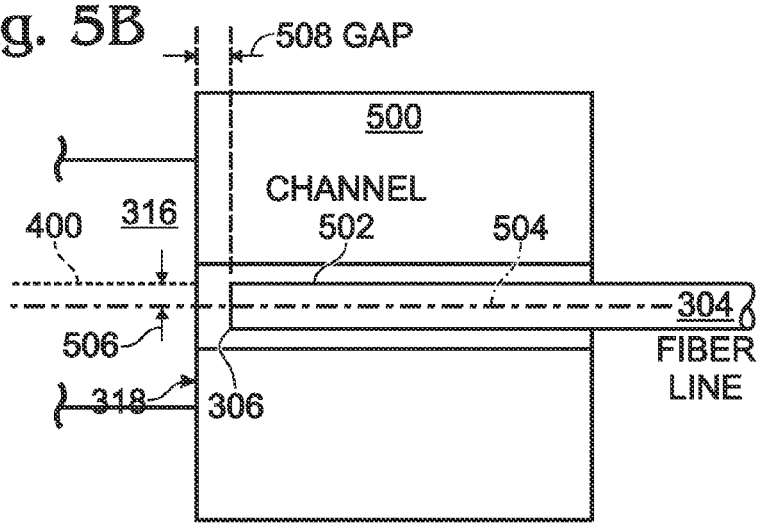

FIGS. 5A and 5B are partial cross-sectional and plan views, respectively, of the first plug of FIG. 3. A first plug cradle 500 has a channel or groove 502 to accept the fiber optic line first end 306 (not shown in FIG. 5A). The channel 502 has a center axis 504 with a tolerance 506 of up to 30 microns with respect to the lens center axis 400. Alternately stated, the center axis of the fiber line core may have a tolerance of up to 30 microns with respect to the lens center axis. The first plug includes a gap 508 between the microlens planar surface 318 and the first fiber optic cable first end of up to 0.4 mm. The second plug (not shown) likewise has a cradle, channel, dimensions, and tolerance as described above.

Figure 6:
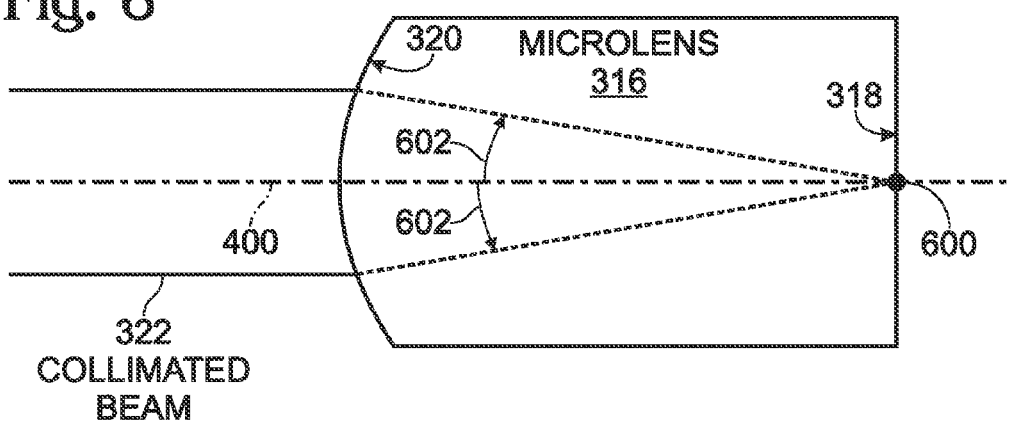
FIG. 6 is a partial cross-sectional view of the first plug microlens of FIG. 3.

FIG. 6 is a partial cross-sectional view of the first plug microlens of FIG. 3. The first plug microlens modifies the magnification of light between the collimated beam 322 at convex surface 320 and a point 600 on the planar surface 318 along the lens center axis 400, forming a cone with an angle 602 of 10 to 11 degrees with respect the lens center axis 400. The second plug (not shown) likewise has the same magnification/demagnification features as the first plug microlens.

Figure 7A:
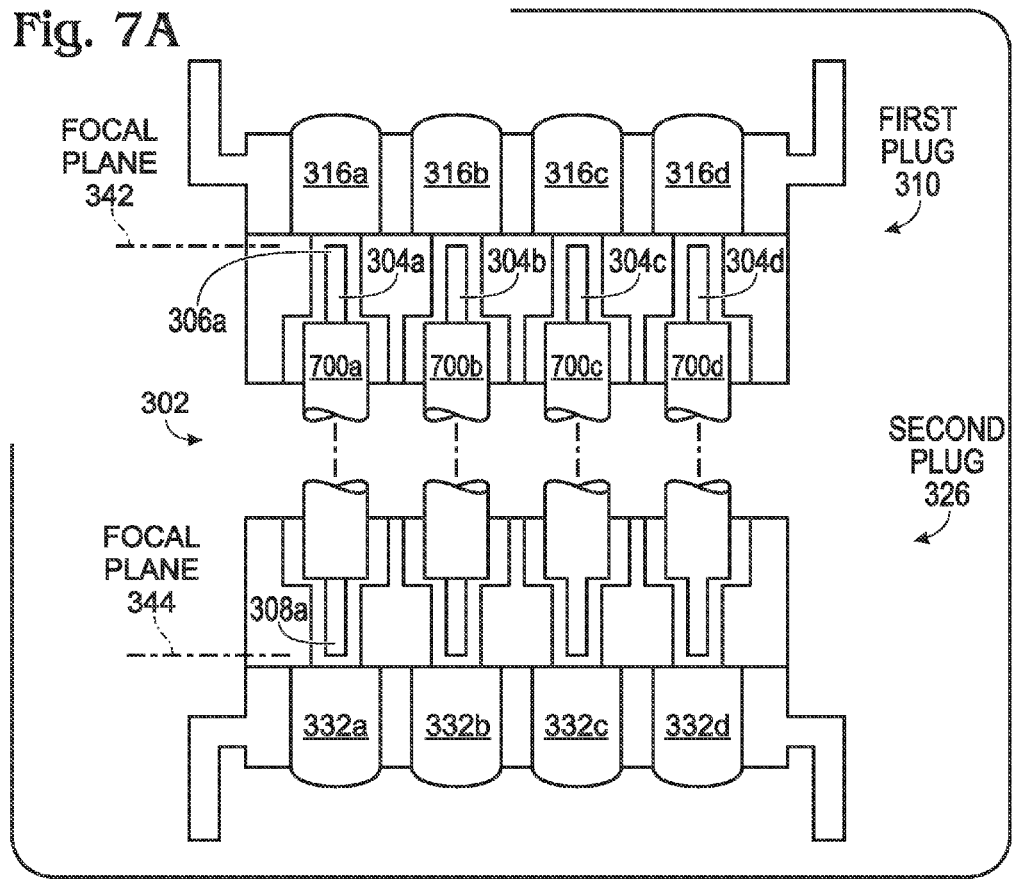
FIGS. 7A and 7B are drawings depicting a fiber optic cable with a cable section that includes a first plurality of fiber optic lines.
Figure 7B:
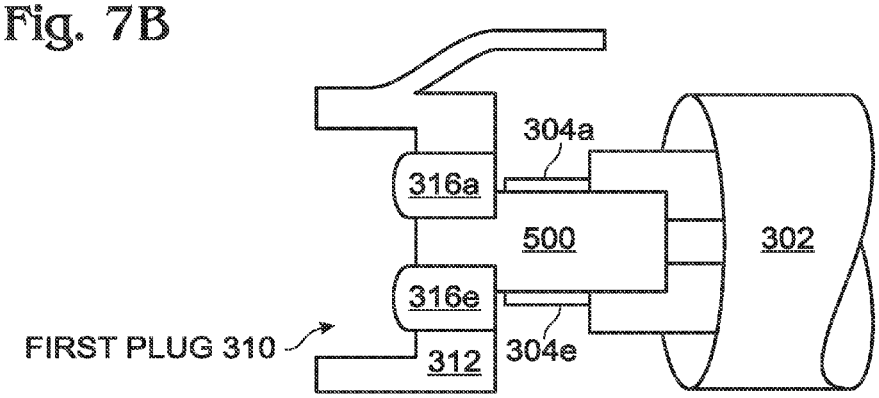

FIGS. 7A and 7B are drawings depicting a fiber optic cable with a cable section that includes a first plurality of fiber optic lines. In FIG. 7A, lines 304a through 304d are shown. Each fiber optic line 304 has a first end 306 and a second end 308. In the example of FIG. 7A, the first plurality is equal to four, but the cable section 302 is not limited to any particular number of lines. The first and second plugs 310/326 include the first plurality of microlenses, respectively 316a-316d and 332a-332d. Each microlens 316/332 has a planar surface 318/334 to engage a corresponding fiber optic line end and a convex surface 320/336 to transceive light in a corresponding collimated beam with a jack optical interface (not shown). Each fiber optic cable end 306/308 is formed in a focal plane 342/344 of a corresponding first plug microlens 316/332. A layer of cladding 700 is also shown surrounding the fiber cores 304. In one aspect the cladding diameter is about 0.49 mm and the core diameter is about 0.0625 mm. Typically, the cladding is covered with a buffer and plenum jacket, which is not shown because it is stripped away.

As shown in FIG. 7B, there may be multiple rows of microlenses, e.g., a top row and a bottom row. Note: a completely assembled plug would include top and bottom crimping plates (not shown), to secure the fiber lines 304 to the cradle 500. In one aspect, the first plug mechanical body has the form factor of an 8 Position 8 Contact (8P8C) plug mechanical body.

Figure 19A:
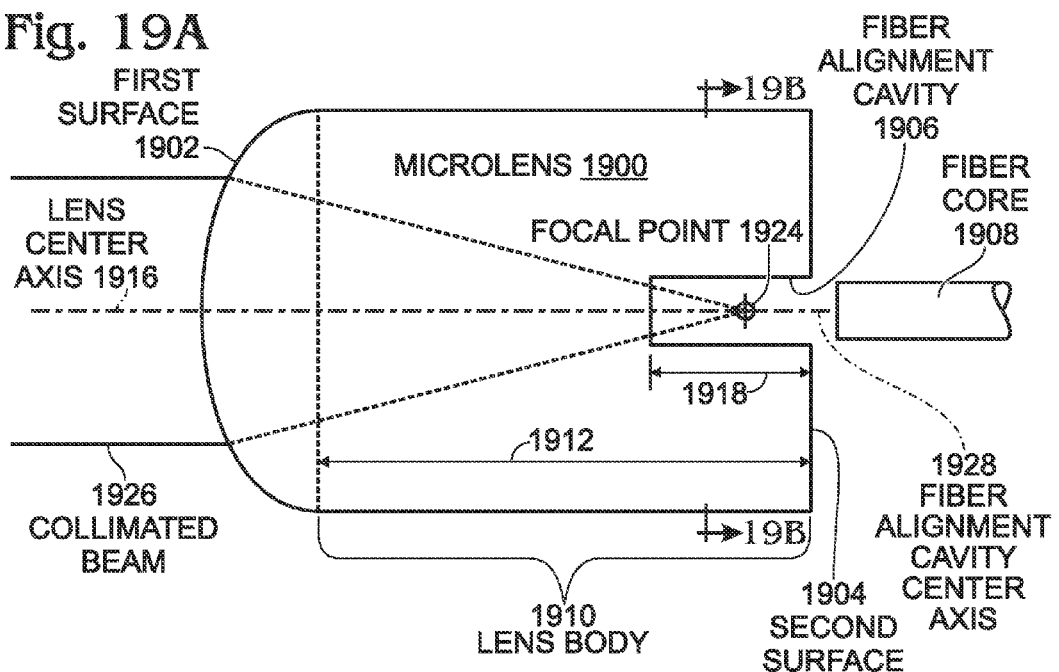
FIGS. 19A and 19B are partial cross-sectional views depicting a first variation of a fiber optical connector microlens with a self-aligning optical fiber cavity.
Figure 19B:
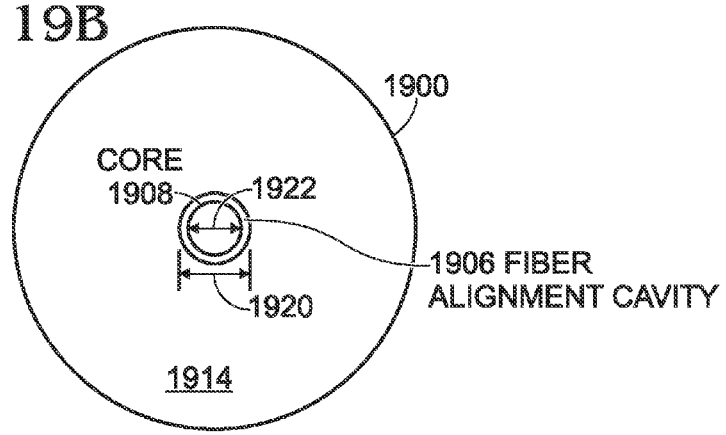

FIGS. 19A and 19B are partial cross-sectional views depicting a first variation of a fiber optical connector microlens with a self-aligning optical fiber cavity. The microlens 1900 comprises a convex first lens surface 1902 and a second lens surface 1904. Although the second lens surface 1904 is shown as planar, in other aspects it may also be convex (see FIG. 20A). Further, in other aspects the second lens surface can be aspheric or holographic. As is well known in the art, a convex lens surface can be described by a portion of a circular circumference. That is, a convex surface be can defined by a radius with respect to a center point. An aspheric or aspherical lens is a more complicated shape that may include a surface portion defined by a radius, and other portions defined by a hyperbola or parabola, for example. A holographic lens might be fabricated from a plurality of closely packed, distinct convex (or aspheric) lens. For example, a holographic lens might be a fly's-eye or integral lens array.

A fiber alignment cavity 1906 is integrally formed with the second lens surface 1904 to accept an optical fiber core 1908. In this aspect, the fiber alignment cavity 1906 is formed in the lens second surface 1904. That is, the fiber alignment cavity penetrates the lens second surface 1904.

A lens body 1910 is interposed between the first lens surface 1902 and second lens surface 1904. The lens body 1910 has a lens body length 1912, and a cross-sectional area 1914 with a lens center axis 1916. In one aspect, the fiber alignment cavity 1906 has a center axis 1928 aligned with the lens center axis 1916. Typically, the fiber alignment cavity 1906 has a length 1918, aligned with the lens center axis 1916, which is in the range of 5 to 10% of the lens body length 1912. In one aspect, a focal point 1924 is formed inside the fiber alignment cavity 1906, when transceiving light in a collimated beam 1926 via the first lens surface 1902. Note, when the second lens surface 1904 is planar, it can be said that the focal point is formed as a result of the first lens surface, as the planar surface does not modify magnification. When the second lens surface is convex, the focal point is ultimately formed as a result of the second (convex) lens surface. Alternately stated, the focal point is formed in the focal plane of the first lens surface, as modified by the second lens surface. The effect of such a microlens with two convex lens surfaces can be seen in FIGS. 15-17, in the transceiving of light between a jack lens and an optical element (VCSEL or photodiode).

The first and second lens surfaces 1902/1904 may be formed from a polycarbonate resin thermoplastic such as lexan or ultem. The fiber alignment cavity 1906 has a minimal cross-section 1920 with a shape such as a triangle, a square, a rectangle, circle, or an oval (a circle is shown). Typically, the fiber alignment cavity 1906 accepts an optical fiber core 1908 having a first diameter 1922, and the cavity minimal cross-section 1920 is about 5% greater than the first diameter 1922. Note: these same dimensional features also apply to the other aspects of the fiber alignment cavity presented below.

FIGS. 20A, 20B, and 20D are partial cross-sectional views depicting a second variation of the fiber optical connector microlens with self-aligning optical fiber cavity, and FIGS. 20C and 20E are perspective drawings. An integrally formed cradle 2000 with a cradle surface 2002 extends from the lens second surface 1906. A channel 2004 is formed in the cradle surface 2002, with a center axis 2006 aligned with the lens center axis 1916. The fiber alignment cavity 1906 includes a bridge 2008 covering a portion of the channel 2004. As shown in FIGS. 20A and 20B, the bridge 2008 includes a first end 2010 connected to the second lens surface 1904, and an exposed second end 2012. FIG. 20C is a perspective drawing illustrating the variation of FIGS. 20A and 20B. As shown in FIG. 20D, the bridge 2008 includes an exposed first end 2010 separated from the second lens surface 1904 by an opening 2014, and an exposed second end 2012. FIG. 20E is a perspective drawing illustrating the variation of FIGS. 20 D.

Figure 21A:
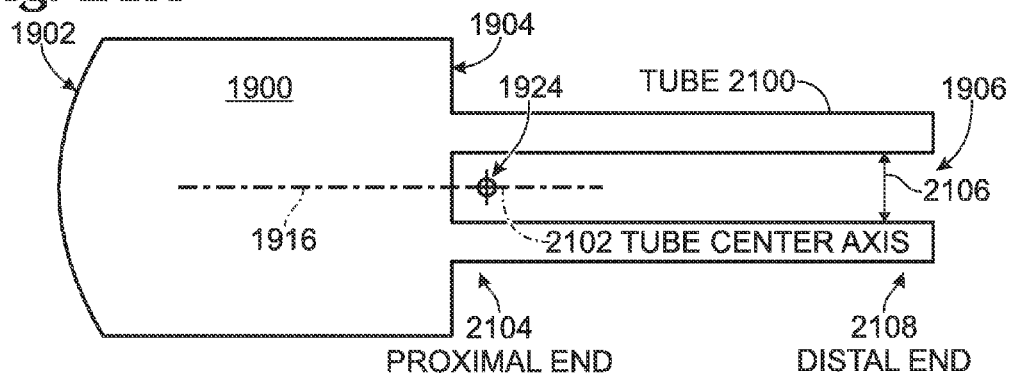
FIGS. 21A through 21C are partial cross-sectional views depicting a third variation of the fiber optical connector microlens with self-aligning optical fiber cavity.
Figure 21B:
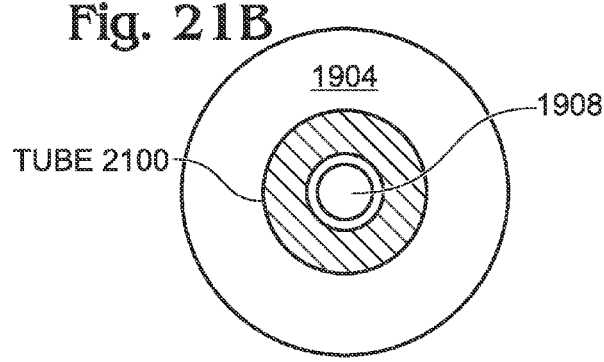
Figure 21C:
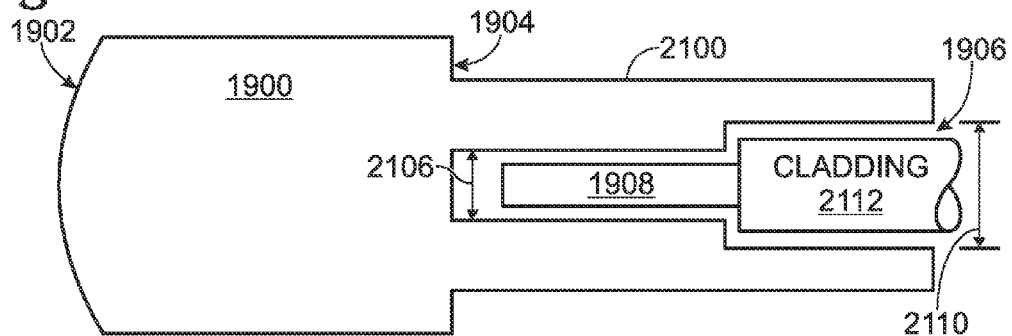

FIGS. 21A through 21C are partial cross-sectional views depicting a third variation of the fiber optical connector microlens with self-aligning optical fiber cavity. In this aspect, the fiber alignment cavity 1906 includes an integrally formed tube 2100 extending from the lens second surface 1904, with a center axis aligned 2102 with the lens center axis 1916. As shown in FIG. 21A, the tube 2100 has a proximal end 2104 adjacent the lens second surface 1906 with a first diameter 2106 to accept an optical fiber core 1908, and a distal end 2108 with a second diameter 2110 to accept an optical fiber with a cladding layer 2112.

Figure 22A:
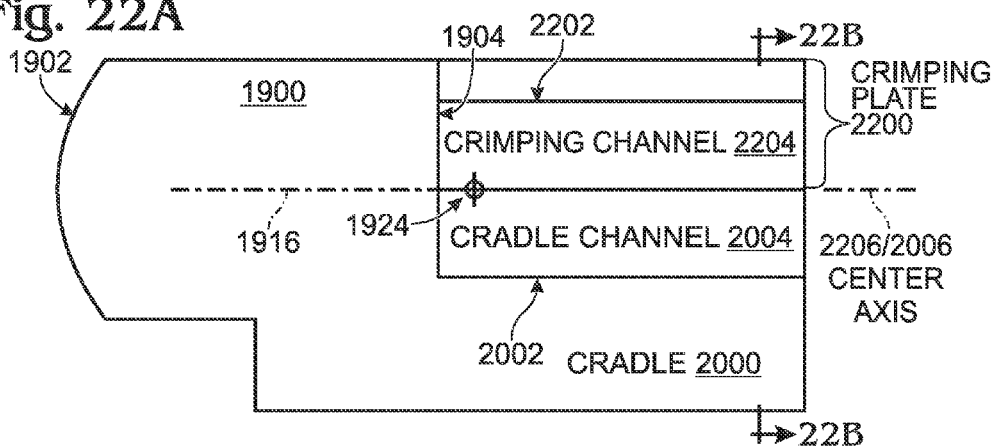
FIGS. 22A and 22B are partial cross-sectional views depicting a fourth variation of the fiber optical connector microlens with self-aligning optical fiber cavity.
Figure 22B:
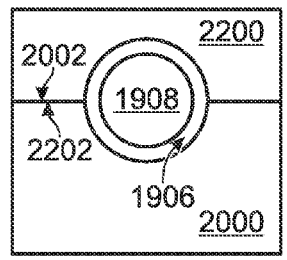

FIGS. 22A and 22B are partial cross-sectional views depicting a fourth variation of the fiber optical connector microlens with self-aligning optical fiber cavity. An integrally formed cradle 2000 with a cradle surface 2002 extends from the lens second surface 1904. A cradle channel 2004 is formed in the cradle surface 2002, with a center axis 2006 aligned with the lens center axis 1916. A crimping plate 2200 with an interior surface 2202 is mechanically secured to the cradle 2000. A number of means are known in the art to permanently or selectively secure the crimping late 2200 to the cradle 2000. The microlens alignment mechanism is not limited to any particular mechanism. In some aspects, the crimping plate 2200 is used to compress the fiber core and/or fiber cladding layer, to hold the fiber in place with respect to the microlens and cradle.

As shown, a crimping channel 2204 is formed in the crimping plate interior surface 2202, with a center axis 2206 aligned with the lens center axis 1916 (and channel center axis 2006). The fiber alignment cavity 1906 is formed between the cradle channel 2006 and crimping channel 2204. In another aspect not shown, the cradle and crimping channels have a first diameter to accommodate the fiber core and a second diameter to accommodate a fiber cladding layer.

Figure 23C:
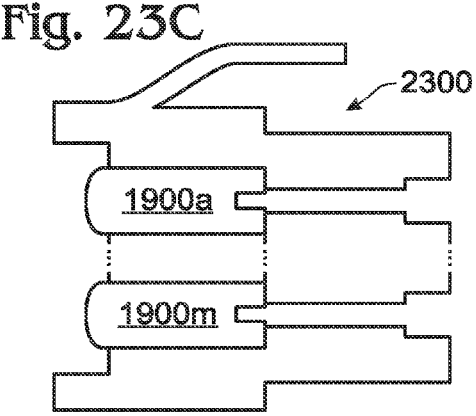
FIGS. 23A through 23C are partial cross-sectional views depicting a first variation of a fiber optic connector plug with an optical fiber self-alignment mechanism.
Figure 23A:
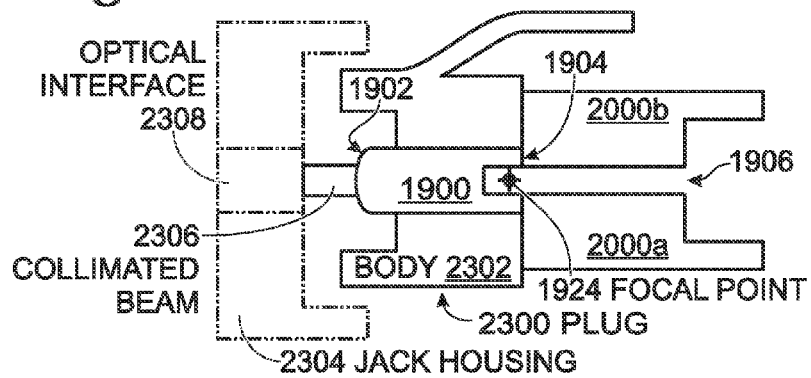
Figure 23B:
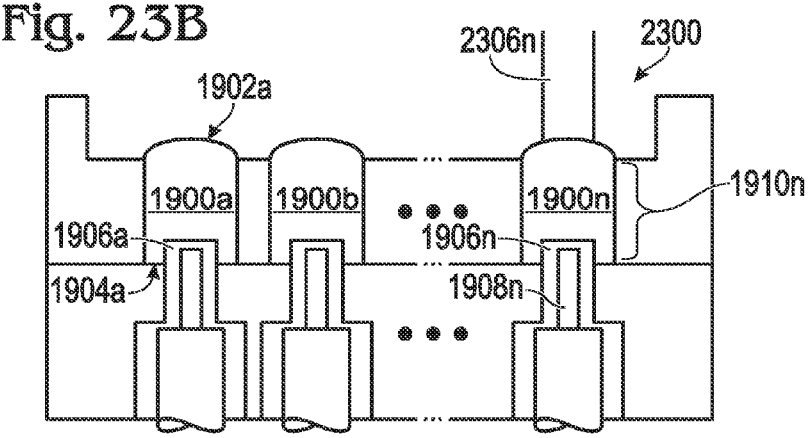

FIGS. 23A through 23C are partial cross-sectional views depicting a first variation of a fiber optic connector plug with an optical fiber self-alignment mechanism. The plug 2300 comprises a mechanical body 2302 shaped to selectively engage and disengage a jack housing 2304 (shown in phantom), and a microlens 1900. As described above in the explanation of FIGS. 19 through 22B, the microlens 1900 has a convex first lens surface 1902 to transceive light in a collimated beam 2306 with a jack optical interface 2308, and a second lens (convex or planar) surface 1904. A fiber alignment cavity 1906 is integrally formed with the second lens surface 1904 to accept an optical fiber core. Typically, the mechanical body 2302 and microlens 1900 are a single injection molded piece made from a polycarbonate resin thermoplastic such as lexan or ultem. As in FIGS. 19A and 19B, the fiber alignment cavity 1906 penetrates the lens second surface 1904. As above, the microlens 1900 forms a focal point 1924 inside the fiber alignment cavity 1906, when transceiving light in a collimated beam 2306 via the first lens surface 1902.

FIG. 23B depicts a plug with a first plurality of microlenses, 1900a through 1900n, where n is a variable not limited to any particular value. Each microlens 1900 has a convex first surface 1902 to transceive light in a corresponding collimated beam 2306 with a first jack optical interface (not shown), the second lens surface 1904, and the fiber alignment cavity 1906 variation depicted in FIG. 23A. FIG. 23C is another partial cross-sectional view. Shown are m rows of microlenses 1900, where m is not limited to any particular value.

Figure 24A:
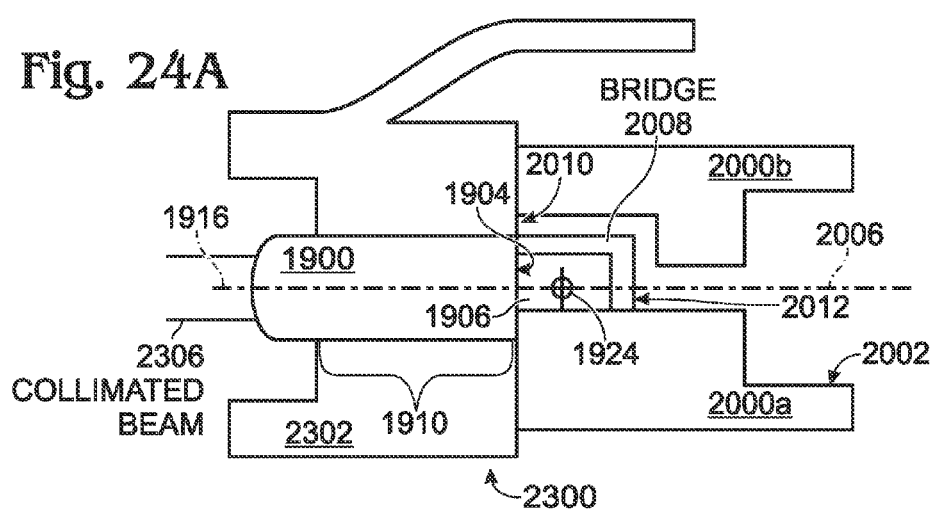
FIGS. 24A and 24B are partial cross-sectional views depicting a second variation of a fiber optic connector plug with an optical fiber self-alignment mechanism.
Figure 24B:
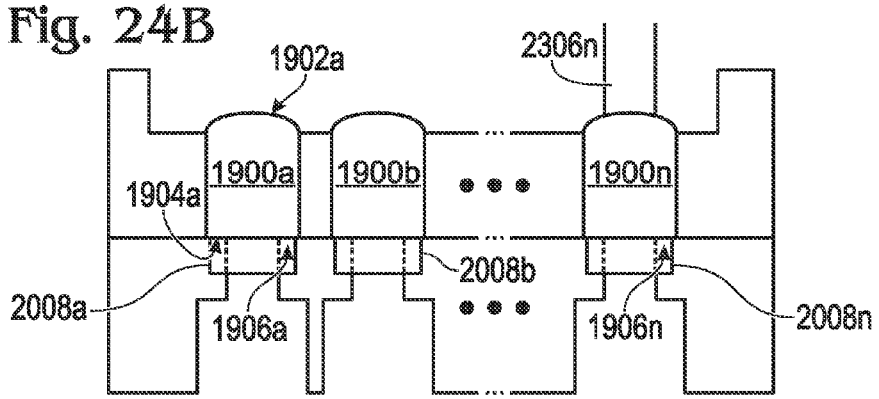

FIGS. 24A and 24B are partial cross-sectional views depicting a second variation of a fiber optic connector plug with an optical fiber self-alignment mechanism. As in FIGS. 20A through 20D, a lens body 1910 is interposed between the first and second lens surfaces 1902/1904, having a cross-sectional area with a lens center axis 1916. A cradle 2000 is integrally formed with the mechanical housing 2302 and microlens 1900, with a cradle surface 2002 extending from the lens second surface 1904. A channel 2004 is formed in the cradle surface 2002, with a center axis 2006 aligned with the lens center axis 1916. The fiber alignment cavity 1906 includes a bridge 2008 covering a portion of the channel 2004, with a first end 2010 connected to the second lens surface 1904, and an exposed second end 2012. In another aspect not shown here (see FIG. 20D), there is an opening between the bridge first end 2010 and the lens second surface 1904.

FIG. 24B depicts a plug with a first plurality of microlenses, 1900a through 1900n, where n is a variable not limited to any particular value. Each microlens 1900 has a convex first surface 1902 to transceive light in a corresponding collimated beam 2306 with a first jack optical interface (not shown), the second lens surface 1904, and the fiber alignment cavity 1906 variation depicted in FIG. 24A. Although not explicitly shown, the plug may comprise m rows of microlenses, where m is not limited to any particular value.

Figure 25A:
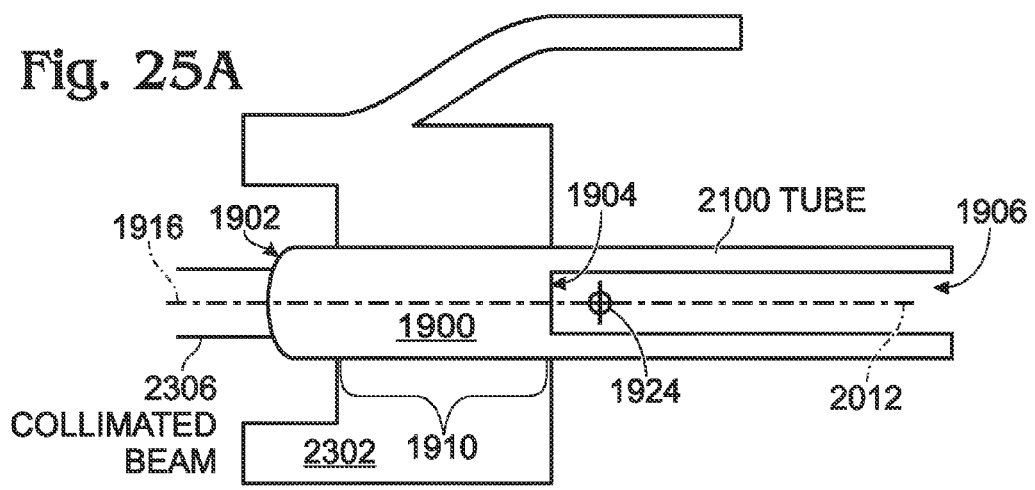
FIGS. 25A and 25B are partial cross-sectional views depicting a third variation of a fiber optic connector plug with an optical fiber self-alignment mechanism.
Figure 25B:
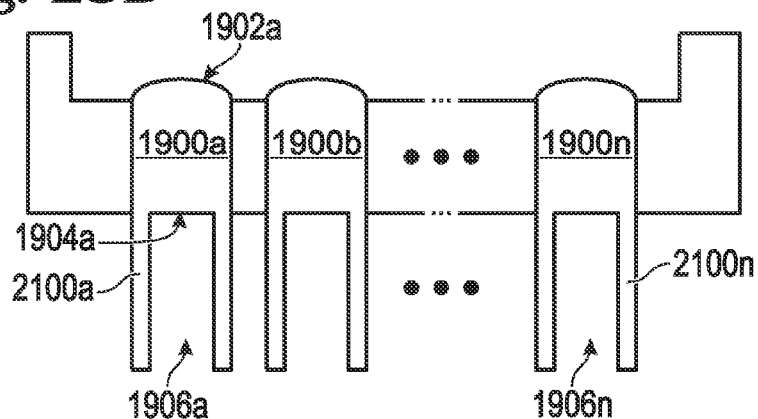

FIGS. 25A and 25B are partial cross-sectional views depicting a third variation of a fiber optic connector plug with an optical fiber self-alignment mechanism. As in FIGS. 21A and 21B, a lens body 1901 is interposed between the first and second lens surfaces 1902/1904, having a cross-sectional area with a lens center axis 1916. The fiber alignment cavity 1906 includes a tube 2100, integrally formed with the mechanical body 2302 and microlens 1900, extending from the lens second surface 1904, with a center axis 2102 aligned with the lens center axis 1916. Although only a constant diameter variation is explicitly depicted here, the tube may have a second diameter to accept a fiber cladding layer as shown in FIG. 21B FIG. 25B depicts a plug with a first plurality of microlenses, 1900a through 1900n, where n is a variable not limited to any particular value. Each microlens 1900 has a convex first surface 1902 to transceive light in a corresponding collimated beam 2306 with a first jack optical interface (not shown), the second lens surface 1904, and a fiber alignment cavity 1906 variation depicted in FIG. 25A. Although not explicitly shown, the plug may comprise m rows of microlenses, where m is not limited to any particular value.

Figure 26A:
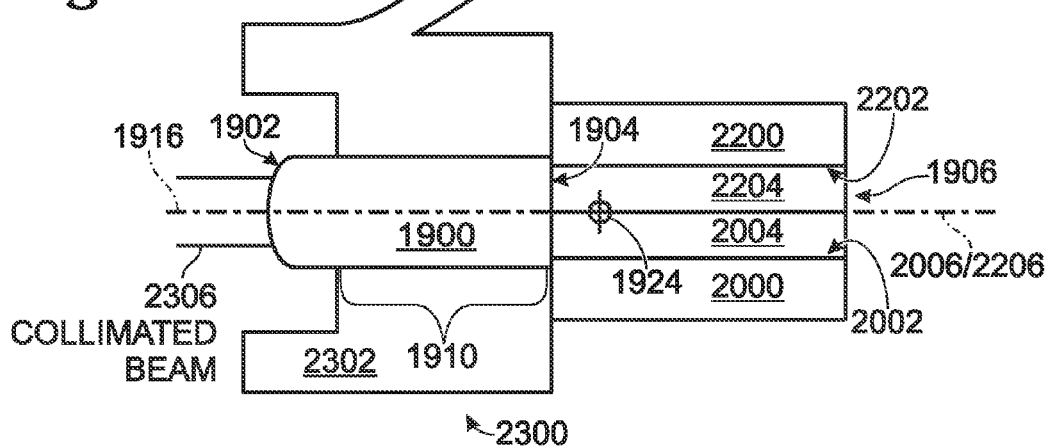
FIGS. 26A through 26C are partial cross-sectional views depicting a fourth variation of a fiber optic connector plug with an optical fiber self-alignment mechanism.
Figure 26B:
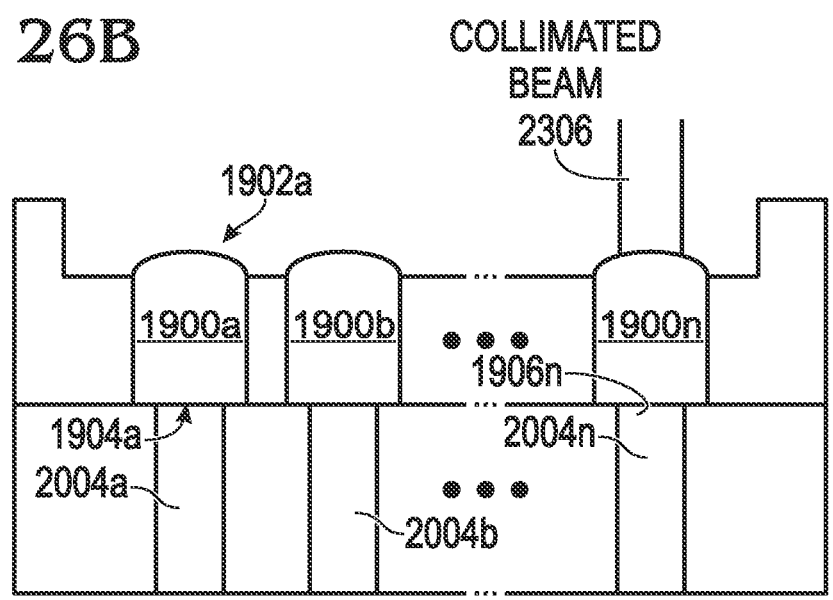
Figure 26C:
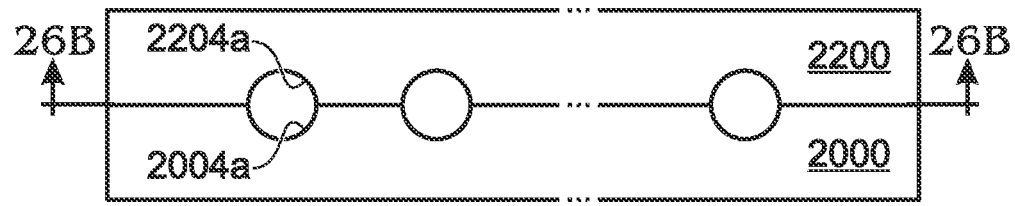

FIGS. 26A through 26C are partial cross-sectional views depicting a fourth variation of a fiber optic connector plug with an optical fiber self-alignment mechanism. As in FIGS. 22A and 22B, a lens body 1910 is interposed between the first and second lens surfaces 1902/1904, having a cross-sectional area with a lens center axis 1916. A cradle 2000 is integrally formed with the mechanical body 2302 and microlens 1900, with a cradle surface 2002 extending from the lens second surface 1904. A cradle channel 2004 is formed in the cradle surface 2002, with a center axis 2006 aligned with the lens center axis 1916. A crimping plate 2200 with an interior surface 2202 is mechanically secured to the cradle 2000. A crimping channel 2204 is formed in the crimping plate interior surface 2202, with a center axis 2206 aligned with the lens center axis 1916 and cradle channel 2004. The fiber alignment cavity 1906 is formed between the cradle channel 2004 and crimping channel 2204.

FIGS. 26B and 26C depicts a plug with a first plurality of microlenses, 1900a through 1900n, where n is a variable not limited to any particular value. Each microlens 1900 has a convex first surface 1902 to transceive light in a corresponding collimated beam 2306 with a first jack optical interface (not shown), the second lens surface 1904, and the fiber alignment cavity 1906 variation depicted in FIG. 26A. Although not explicitly shown, the plug may comprise m rows of microlenses, where m is not limited to any particular value. Note: only the cradle channel 2004 can be seen in FIG. 26B.

Figure 8:
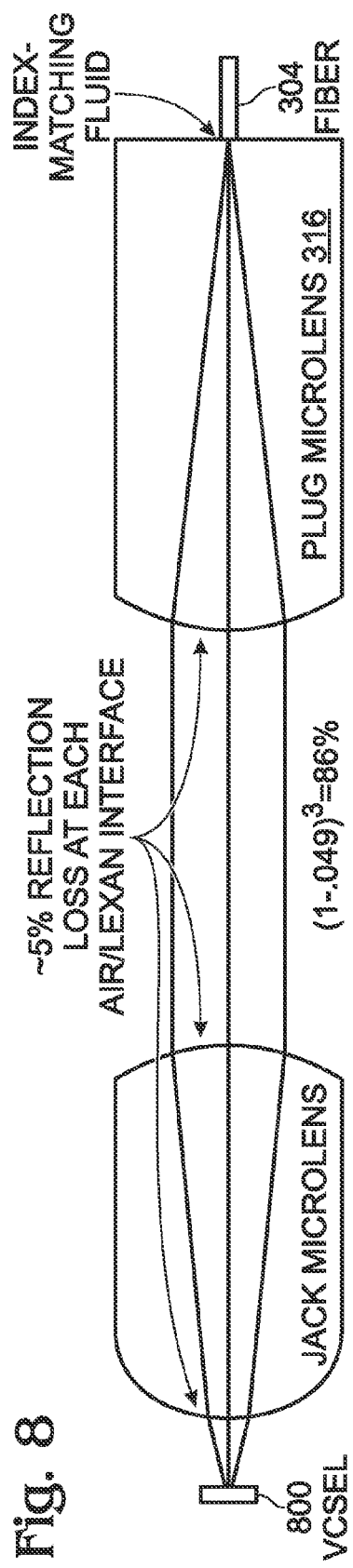
FIG. 8 is a diagram depicting communicating jack and plug microlens.

FIG. 8 is a diagram depicting communicating jack and plug microlens. A transmitting vertical-cavity surface-emitting laser (VCSEL) 800 has a numerical aperture (NA) of 0.259, so that light is emitted into a 30 degree cone at the $1/e^2$ point:

$NA = 1 \sin 15° = 0.259$.

The NA of the fiber line 304 is 0.185, which translates into an acceptance angle cone of about 21 degrees.

One aspect of coupling efficiency is reflection (R). A normally incident reflection of ~4.9% is typical of each air/lexan interface. For rays not normally incident, R is a function of angle of incidence and polarization:

n for lexan @ 850 nm~1.568;

n' for air=1;

$R = ((n-n')/(n+n'))2 \sim 4.9\%$;

Assuming each jack and plug use a microlens, there are 3 air-to-lexan interfaces. The fiber/plug interface is filled with index-matching fluid, so no reflection is assumed for this interface;

$(1-0.049)^3 = 86\%$ optimal coupling efficiency.

Figure 9:
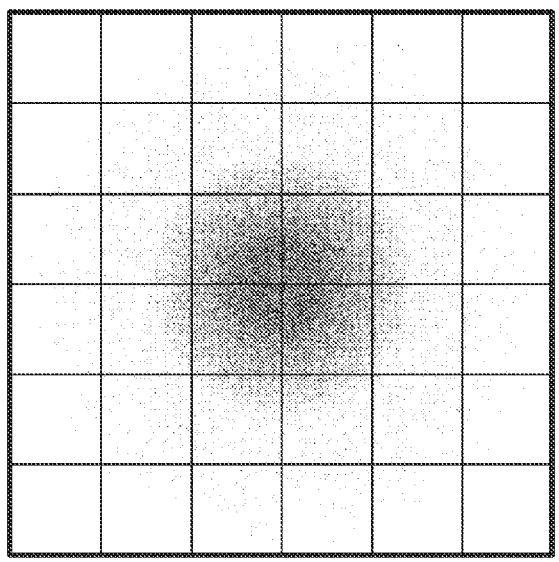
FIG. 9 is a model calculation graphically depicting the coupling efficiency of the system of FIG. 8.

FIG. 9 is a model calculation graphically depicting the coupling efficiency of the system of FIG. 8. The model shows that 86% of the transmitted light falls within a circle of about 0.07 mm, which is about the diameter of a particular POF optical fiber core.

Figure 10:
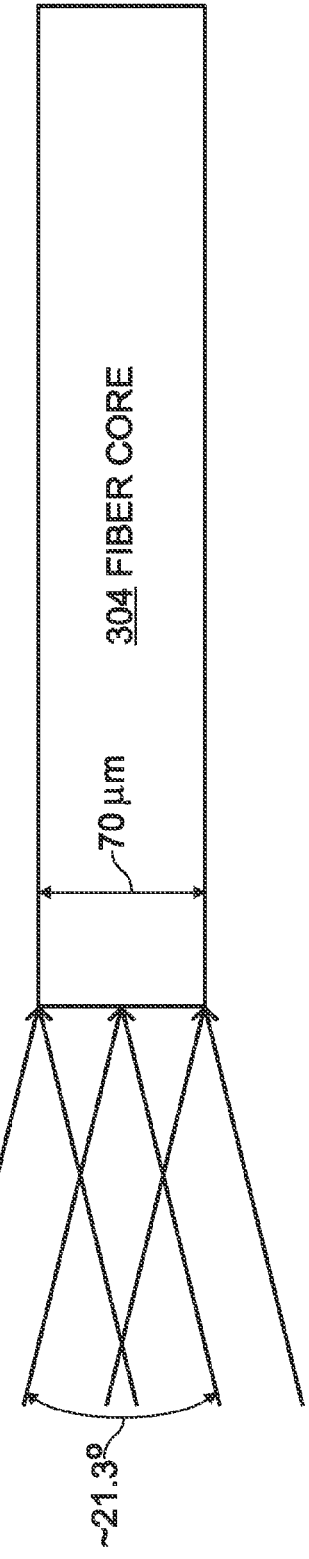
FIG. 10 is a diagram depicting the fiber core acceptance angle.

FIG. 10 is a diagram depicting the fiber core acceptance angle. Assuming a 70 micron diameter gradient index (GRIN) fiber core, the NA is 0.185, which translates to an acceptance angle of +/−10.7°. This assumption ignores the fact that the acceptance angle falls of towards to core edges.

Many of the system tolerances can be converted into an effective fiber lateral decenter. For example, VCSEL lateral decentering can be multiplied by the system magnification. Plug tilt can be accounted for by taking the taking the tangent of the tilt and multiplying it by the effective focal length of the plug lens. Most of the other tolerances tend to change the shape of the beam rather than causing the beam to "walk off" the face of the fiber end. With respect to the fiber line of FIG. 10, "lateral" refers to the X plane (in and out of the page) and Y plane (from the page top to the page bottom). The Z plane would be left to right on the page.

Figure 11:
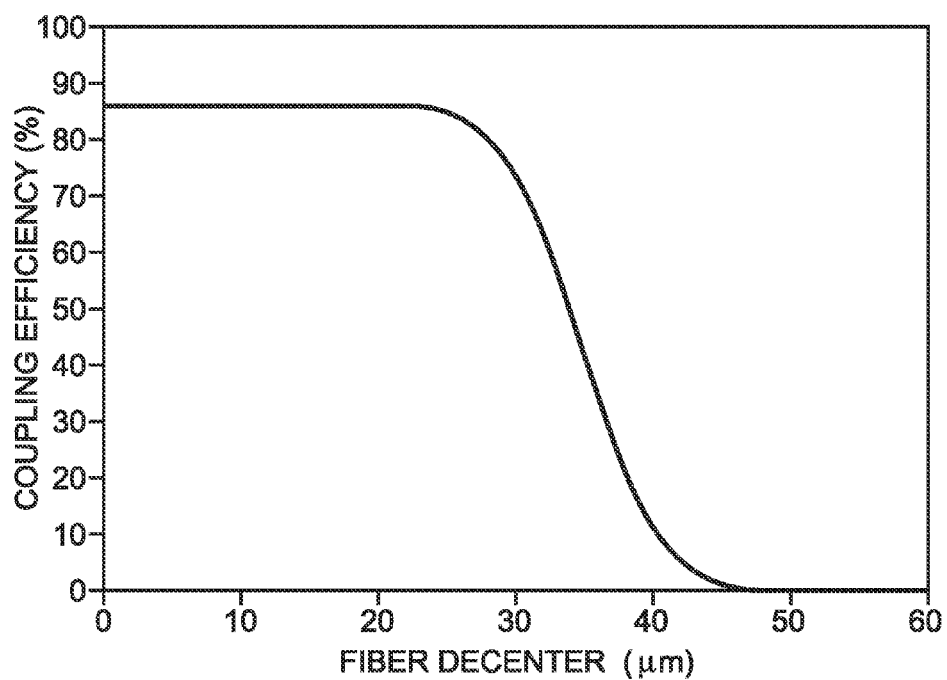
FIG. 11 is a graph depicting the relationship between coupling efficiency and fiber lateral decentering ($\Delta$).

FIG. 11 is a graph depicting the relationship between coupling efficiency and fiber lateral decentering (Δ). The relationship is nonlinear, steeply degrading at about 30 microns of decentering, or about half the core diameter.

Figure 12:
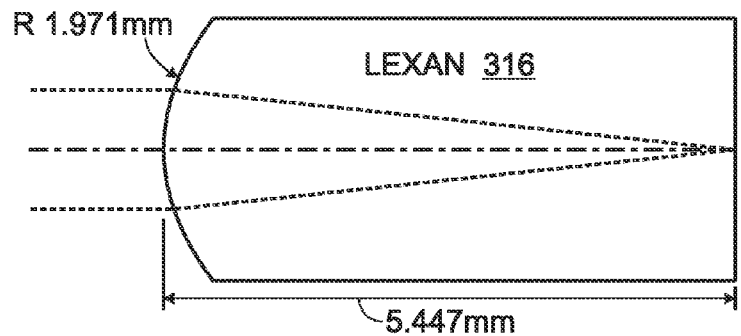
FIG. 12 is a diagram depicting the effective focal length of the plug microlens.

FIG. 12 is a diagram depicting the effective focal length of the plug microlens. Assuming a radius of curvature of 1.971 mm, an overall lens length of 5.447 mm, and a lexan material, the effective focal length of the plug is:

eflplug~5.447 mm/$n_{lexan}$;

eflplug=3.471 mm.

FIG. 13 is a table of tolerances cross-referenced to fiber lateral decentering.

The following is an equation for worst-case effective fiber decentering using tolerances T1 through T5 from the Table of FIG. 13:

$$\text{effective fiber decenter} = T1(1.36) + T2(1.36) + 3.471\tan(T3) + T4 + T5;$$

$$= 1.36(T1 + T2) + 3.471[\tan(T3)] + T4 + T5$$

$$\sim 1.36(T1 + T2) + 3.471(T3) + T4 + T5$$

The tolerances T1 and T2 are proportional to the system magnification (1.36), and the lens tilt is expressed as a tangent in radians, assuming a small-angle approximation. Note: T2 circuit misalignment refers to the relationship between the circuit board on which the optical elements (VCSEL and PD) are mounted and the microlens. T1 VCSEL/PD misalignment refers to misalignment between the VCSEL/PD and the circuit board. The T4 and T5 tolerances are outside the system magnification, and need not be system normalized.

In matrix form the equation is:

$$[T1\ T2\ T3\ T4\ T5] \begin{bmatrix} 1.36 \\ 1.36 \\ 3.471 \\ 1 \\ 1 \end{bmatrix}$$

where
1.36=current system magnification;
3.471 mm=plug focal length; and,
Ti=ith tolerance.

Figure 14:
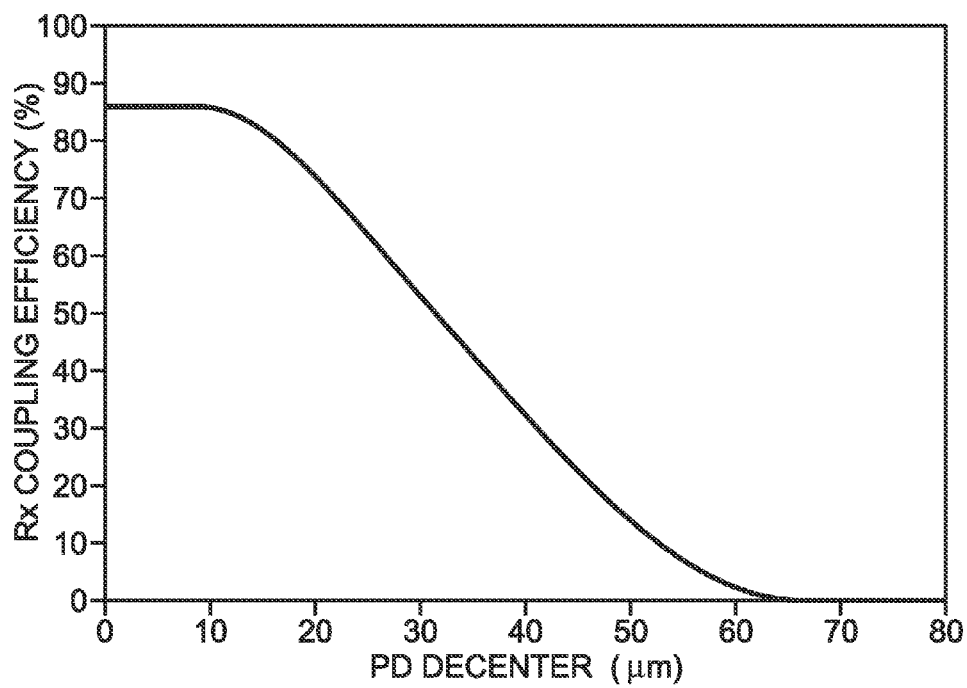
FIG. 14 is a graph depicting coupling efficiency as a function of photodiode (PD) decentering.

FIG. 14 is a graph depicting coupling efficiency as a function of photodiode (PD) decentering.

Figure 15:
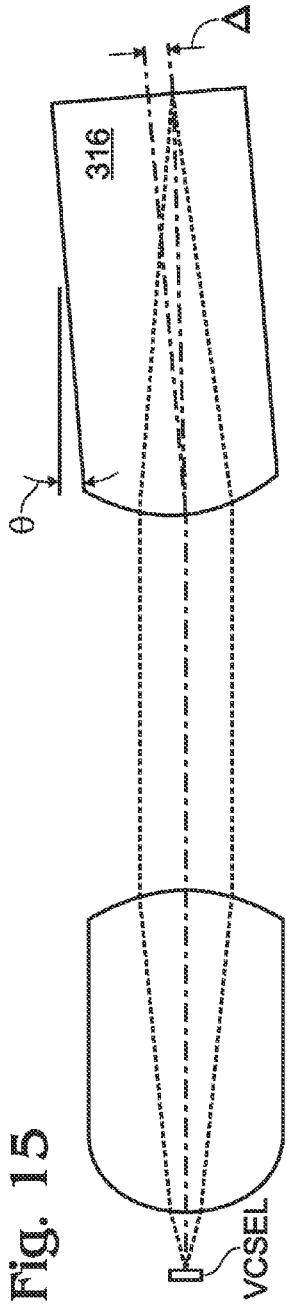
FIG. 15 is a diagram depicting the relationship between fiber decentering and lens tilt.

FIG. 15 is a diagram depicting the relationship between fiber decentering and lens tilt:

$$\Delta = \text{effective fiber decenter}$$
$$= fplug * \tan\theta;$$
$$= 3.471\ mm * \tan\theta;$$

If θ=0.5°, then Δ=30.3 μm. Note: the angle θ has been exaggerated.

Figure 16:
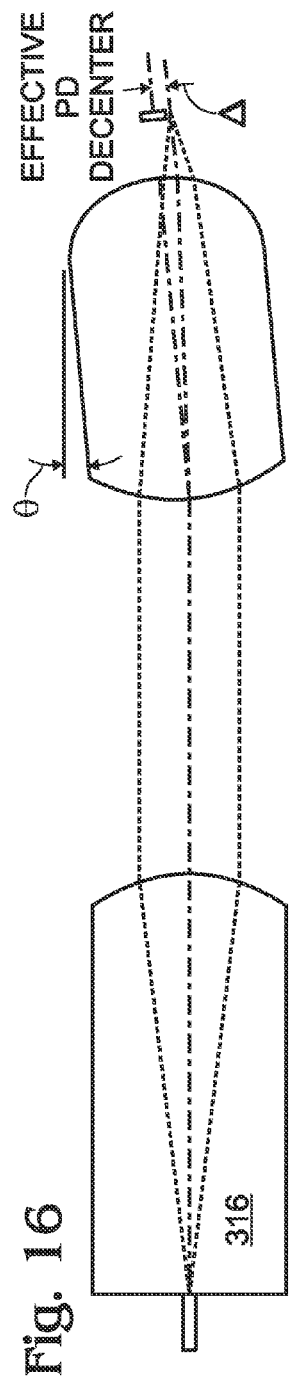
FIG. 16 is a diagram depicting the relationship between PD decentering and lens tilt.

FIG. 16 is a diagram depicting the relationship between PD decentering and lens tilt.

$$\Delta = \text{effective PD decenter}$$
$$= fjack * \tan\theta;$$
$$= 2.504\ mm * \tan\theta;$$

If θ=0.5°, then Δ=21.9 μm.

Figure 17:
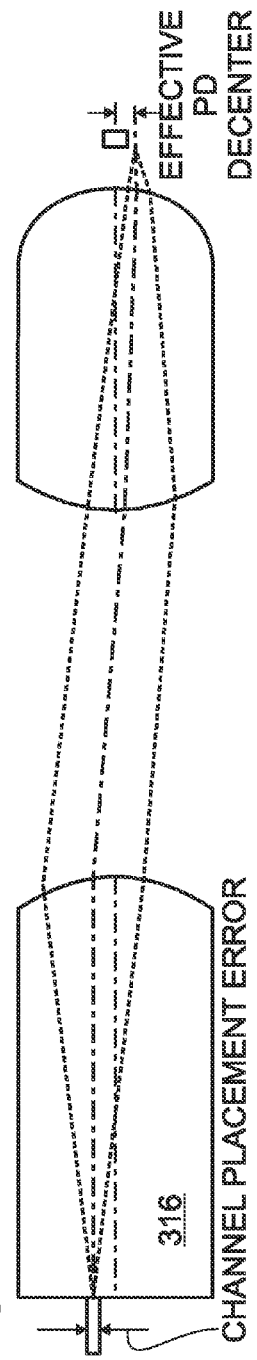
FIG. 17 is a diagram depicting the relationship between PD decentering and groove (channel) placement error.

FIG. 17 is a diagram depicting the relationship between PD decentering and groove (channel) placement error. The channel placement error may also be understood as a lens placement error relative to the channel.

The effective PD decenter=channel placement error*Msys;

where Msys is the system magnification (0.727=1/1.36).

A channel placement error of 7.1 μm results in effective PD decentering of 7.1 μm*0.727=5.2 μm in both the X and Y planes. The overall decentering (the hypotenuse of the triangle) is:

sqrt($5^2+5^2$)=7.1 microns.

A placement error of 10 microns results in a PD decentering of about 10 microns.

Figure 18:
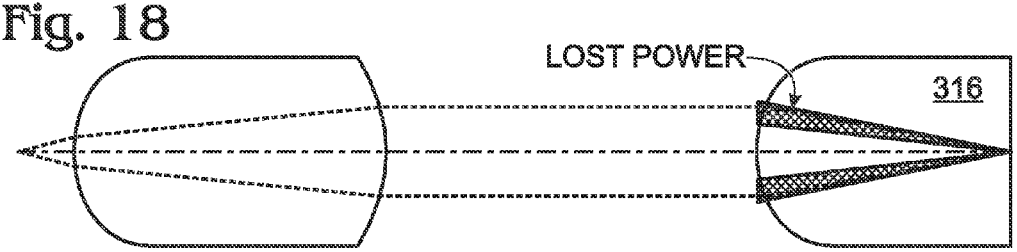
FIG. 18 is a diagram depicting the consequences of shortening the focal length of the plug, without a corresponding change in the jack lens.

FIG. 18 is a diagram depicting the consequences of shortening the focal length of the plug, without a corresponding change in the jack lens. If the plug focal length (fplug) is decreased, the loss in coupling efficiency due to plug angular misalignment can be reduced. However, the fiber core would be overfilled (exceeding the NA 0.185), which would result in some lost energy.

A fiber optic plug and microlens fiber alignment mechanism have been provided. Some examples of particular housing designs, tolerances, and dimensions have been given to illustrate the invention. However, the invention is not limited to merely these examples. Other variations and embodiments of the invention will occur to those skilled in the art.

We claim:

1. A fiber optical connector microlens with a self-aligning optical fiber cavity, the microlens comprising:
    a convex first lens surface;
    a second lens surface; and,
    a fiber alignment cavity integrally formed with the second lens surface, the fiber alignment cavity having a proximal end adjacent the lens second surface with a first diameter to accept an unclad optical fiber core without a ferrule, and a distal end with a second diameter to accept an optical fiber cladding layer.

2. The microlens of claim 1 wherein the second lens surface is selected from a group consisting of convex, aspheric, holographic, and planar surfaces.

3. The microlens of claim 1 further comprising:
    a lens body interposed between the first and second lens surfaces, having a cross-sectional area with a lens center axis; and,
    wherein the fiber alignment cavity has a center axis aligned with the lens center axis.

4. The microlens of claim 1 wherein the fiber alignment cavity penetrates the lens second surface.

5. The microlens of claim 4 further comprising:
    a lens body interposed between the first and second lens surfaces, having a lens body length, and a cross-sectional area with a lens center axis; and,
    wherein the fiber alignment cavity has a length with a center axis, aligned with the lens center axis, that is in a range of 5 to 10% of the lens body length.

6. The microlens of claim 1 wherein the fiber alignment cavity has a minimal cross-section with a shape selected from a group consisting of a triangle, a square, a rectangle, circle, and an oval.

7. The microlens of claim 6 wherein the fiber alignment cavity accepts an optical fiber core having a first diameter, and the cavity minimal cross-section area is about 5% greater than the first diameter.

8. The microlens of claim 1 wherein a focal point is formed inside the fiber alignment cavity, when transceiving light in a collimated beam via the first lens surface.

9. The microlens of claim 1 wherein the first and second lens surfaces are formed from a polycarbonate resin thermoplastic selected from a group consisting of lexan and ultem.

10. The microlens of claim 1 further comprising:
    a lens body interposed between the first and second lens surfaces, having a cross-sectional area with a lens center axis;
    an integrally formed cradle with a cradle surface extending from the lens second surface;
    a channel formed in the cradle surface, with a center axis aligned with the lens center axis; and,
    wherein the fiber alignment cavity includes a bridge covering a portion of the channel.

11. The microlens of claim 10 wherein the bridge includes a first end connected to the second lens surface, and an exposed second end.

12. The microlens of claim 10 wherein the bridge includes an exposed first end separated from the second lens surface by an opening, and an exposed second end.

13. The microlens of claim 1 further comprising:
    a lens body interposed between the first and second lens surfaces, having a cross-sectional area with a lens center axis; and,
    wherein the fiber alignment cavity includes an integrally formed tube extending from the lens second surface, with a center axis aligned with the lens center axis.

14. The microlens of claim 13 wherein the tube has a proximal end adjacent the lens second surface with a first diameter to accept the unclad optical fiber core, and a distal end with a second diameter to accept the optical fiber cladding layer.

15. The microlens of claim 1 further comprising:
- a lens body interposed between the first and second lens surfaces, having a cross-sectional area with a lens center axis;
- an integrally formed cradle with a cradle surface extending from the lens second surface;
- a cradle channel formed in the cradle surface, with a center axis aligned with the lens center axis; and,
- a crimping plate with an interior surface, mechanically secured to the cradle;
- a crimping channel formed in the crimping plate interior surface, with a center axis aligned with the lens center axis; and,
- wherein the fiber alignment cavity is formed between the cradle channel and crimping channel.

16. A fiber optic connector plug with an optical fiber self-alignment mechanism, the plug comprising:
- a mechanical body shaped to selectively engage and disengage a jack housing, and a microlens, the microlens having a convex first lens surface to transceive light in a collimated beam with a jack optical interface, a second lens surface, and a fiber alignment cavity integrally formed with the second lens surface, fiber alignment cavity having a proximal end adjacent the lens second surface with a first diameter to accept an unclad optical fiber core without a ferrule, and a distal end with a second diameter to accept an optical fiber cladding layer.

17. The plug of claim 16 further comprising a plurality of microlenses, each first plug microlens having a convex first surface to transceive light in a corresponding collimated beam with a first jack optical interface, a second lens surface, and a fiber alignment cavity integrally formed with each second lens surface to accept a corresponding unclad optical fiber core.

18. The plug of claim 16 wherein the mechanical body and microlens are a single injection molded piece made from a polycarbonate resin thermoplastic selected from a group consisting of lexan and ultem.

19. The plug of claim 16 wherein the fiber alignment cavity penetrates the lens second surface.

20. The plug of claim 16 wherein the microlens forms a focal point inside the fiber alignment cavity, when transceiving light in a collimated beam via the first lens surface.

21. The plug of claim 16 further comprising:
- a lens body interposed between the first and second lens surfaces, having a cross-sectional area with a lens center axis;
- a cradle, integrally formed with the mechanical body and microlens, with a cradle surface extending from the lens second surface;
- a cradle channel formed in the cradle surface, with a center axis aligned with the lens center axis; and,
- a crimping plate with an interior surface, mechanically secured to the cradle;
- a crimping channel formed in the crimping plate interior surface, with a center axis aligned with the lens center axis; and,
- wherein the fiber alignment cavity is formed between the cradle channel and crimping channel.

22. The plug of claim 16 further comprising:
- a lens body interposed between the first and second lens surfaces, having a cross-sectional area with a lens center axis;
- a cradle, integrally formed with the mechanical housing and microlens, with a cradle surface extending from the lens second surface;
- a channel formed in the cradle surface, a center axis aligned with the lens center axis; and,
- wherein the fiber alignment cavity includes a bridge covering a portion of the channel, with a first end connected to the second lens surface, and an exposed second end.

23. The plug of claim 16 further comprising:
- a lens body interposed between the first and second lens surfaces, having a cross-sectional area with a lens center axis; and,
- wherein the fiber alignment cavity includes a tube, integrally formed with the mechanical body and microlens, extending from the lens second surface, with a center axis aligned with the lens center axis.

24. The microlens of claim 1 further comprising:
- a fiber core interface in the fiber alignment channel adjacent the second lens surface to accept an index matching fluid.

25. The plug of claim 16 further comprising:
- a fiber core interface in the fiber alignment channel adjacent the second lens surface to accept an index matching fluid.

* * * * *